Sept. 6, 1960   H. J. BROWN   2,951,410
TAPE CUTTER
Filed June 4, 1957   3 Sheets-Sheet 1
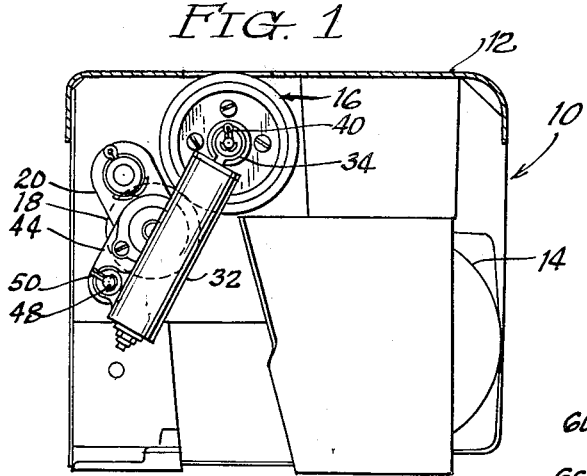
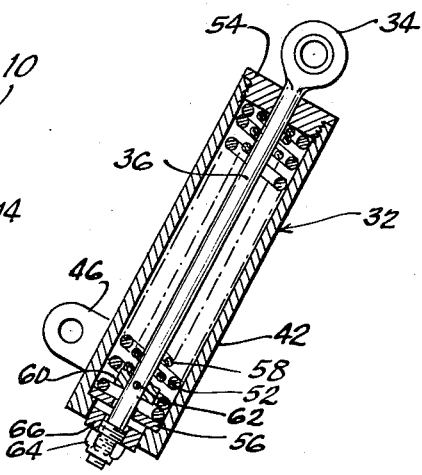
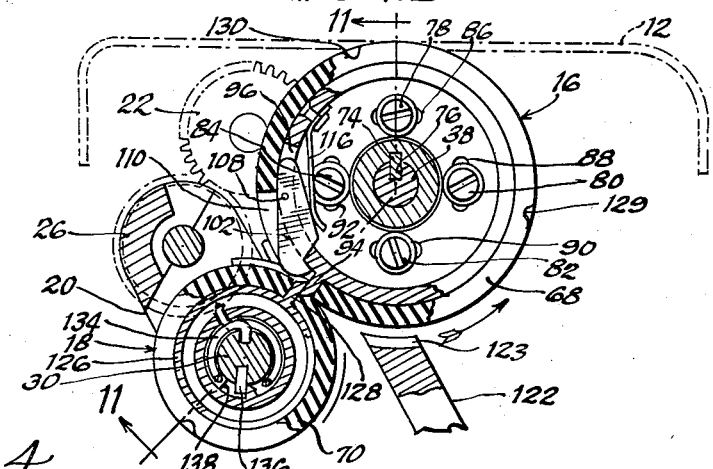
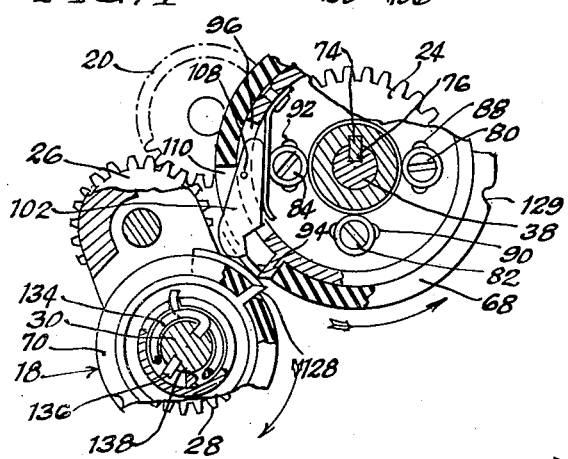
INVENTOR.
Harvey J. Brown
BY
Attorney Sept. 6, 1960  H. J. BROWN  2,951,410
TAPE CUTTER
Filed June 4, 1957  3 Sheets-Sheet 2

INVENTOR.
Harvey J. Brown
BY
Attorney

Sept. 6, 1960          H. J. BROWN          2,951,410

TAPE CUTTER

Filed June 4, 1957          3 Sheets-Sheet 3

INVENTOR.
Harvey J. Brown
BY
Attorney

United States Patent Office 2,951,410
Patented Sept. 6, 1960

2,951,410

TAPE CUTTER

Harvey J. Brown, Detroit, Mich., assignor to Webcor, Inc., Chicago, Ill., a corporation of Illinois Filed June 4, 1957, Ser. No. 663,443

7 Claims. (Cl. 83—304)

This invention relates to a tape cutter for cutting chaff tape and the like into predetermined lengths for uninterrupted disposal thereof, and more particularly to roller and cutter apparatus which is substantially proof against accidental interference during its operation.

Heretofore, tape cutters have been provided requiring a plurality of rollers spring biased into appropriate cutting and feeding relationship, but which have failed to maintain a uniform cutting pressure as tapes of various thicknesses have been fed thereinto, and have also been subject to jamming by displacement of the rollers relative to one another during a given cutting operation.

It is, accordingly, an object of the present invention to provide a tape cutter as described, wherein the tape is cut by a pair of blades carried on the same rollers used as drive means and pulling means therefor.

Another object of the invention is to provide tape cutter means as described, adapted to cut tape having an axial dimension when cut greater than the peripheral dimension of either of the rollers used therefor.

Another object of the invention is to provide a relatively large drive roller for carrying the tape into cutting position and a relatively small roller (two thirds the size of the drive roller) adapted to rotate a predetermined number of times in relationship to the large roller for each tape cutting operation, means being provided to preclude cutting action prior to the attainment of the said cutting position.

Another object of the invention is to provide gear train means between the large and small rollers adapted to present blade means carried by each of said rollers in cutting alignment when the said cutting position is attained.

Another object of the invention is to provide blade means for each of the said rollers, carried helically across the rollers, so that cutting action will start at a given end of the said blades and progress across the blades.

Another object of the invention is to provide a tape cutter as described wherein torsion spring means are provided for one of the rollers adapted to bias the blade carried thereby into predetermined uniform pressure relationship with the blade of the other roller, whereby the contact point between the said blades will afford pressure which is a predetermined multiple of the pressure afforded by the torsion spring, thereby reducing the amount of torque required to operate the said tape cutter.

Another object of the invention is to provide means to pull the tape under considerable tension and maintain such action concurrent with the cutting operation.

Another object of the invention is to provide helical blades as described, wherein one of the blades is given a recessed camming configuration adjacent the position of initial cutting action thereon, whereby the said blade and its roller may be displaced outwardly upon initial contact between the cutting blades so as to wind the torsion spring a predetermined amount and maintain a uniform cutting pressure between the said blades. Thus, the torsion spring is adapted to preserve the appropriate cutting pressure during the entire cutting action of the blades despite relative rotation of the roller associated therewith due to difference in cutter helix angles and/or the back lash of the connecting gear train.

Another object of the invention is to provide spring means connecting the relatively large roller and the relatively small roller, affording a two-stage spring action, whereby in the first stage the said displacement of the roller carrying the torsion spring may be accomplished in response to the separation which may be produced by normal thicknesses of tape passing between the rollers prior to cutting; the said spring means connecting the rollers presenting relatively extremely high resistance in the second stage to displacement of the rollers beyond a predetermined extent corresponding to the position of the rollers adapted to maintain the cutters in cutting relationship, said relatively high resistance being compatible with the strength of the gear train for the purpose of permitting extreme roller separation thereby preventing damage due to overload when and if the tape to be cut should greatly exceed its normal thickness.

Another object of the invention is to provide means for moving the tape in guided relationship away from the rollers upon completion of a cutting action, including spring actuated levers adapted to cooperate with guide means configured in complementary relationship thereto, said levers affording no interference with relative rotation of the rollers prior to said cutting action.

Another object of the invention is to provide a tape cutter as described, in which the gearing and blades may be synchronized by simple adjustment means requiring little or no skill or training.

Another object is to provide tape cutter means as described, wherein the blades are substantially self-sharpening and the entire construction is of great simplicity and strength so that manufacture may be accomplished with great reliability and expeditiousness.

Other objects and advantages of the invention will become apparent as the description proceeds in accordance with the drawings, in which similar reference characters relate to similar parts, and in which:

Fig. 1 is a side view in elevation of a tape cutter according to the invention;

Fig. 2 is a vertical sectional view of a two-stage spring for use in the said cutter;

Fig. 3 is an enlarged fragmentary, vertical sectional view of the cutter;

Fig. 4 is a view of the structure shown in Fig. 3, showing the rollers thereof in somewhat displaced relationship;

Fig. 5 is a showing of tape cut in the cutter of the invention;

Figure 11:
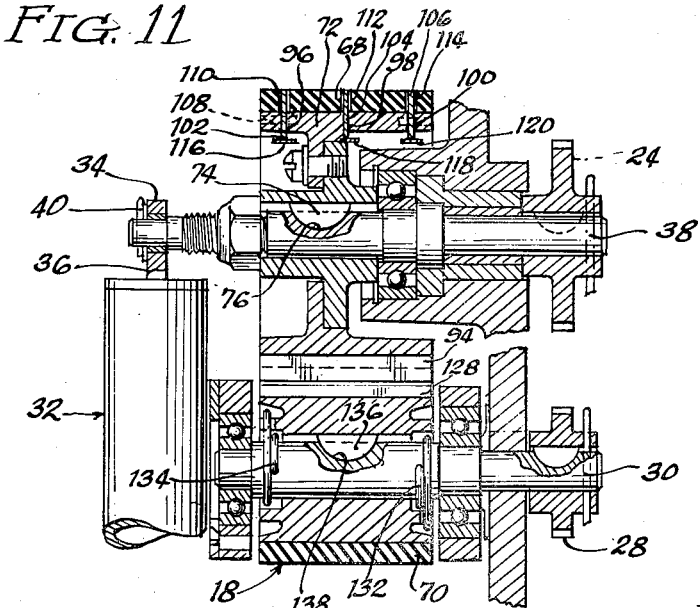
Fig. 11 is a sectional view taken through the lines 11—11 of Fig. 3.
Figure 12:
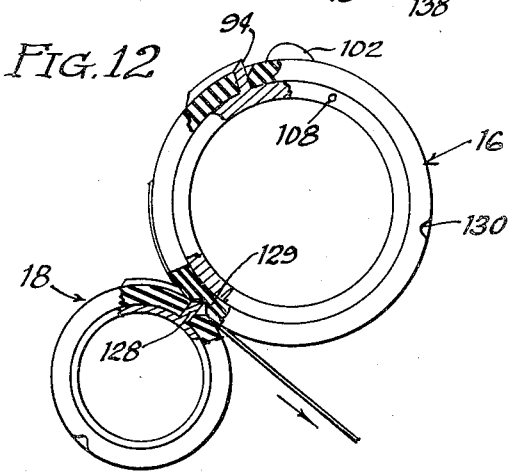
Fig. 12 is a schematic view showing the cyclic action of the small roller prior to attainment of cutting relationship between the blades of the small and large rollers respectively, whereby the tape may be passed between the rollers without cutting or damaging thereof.
Figure 13:
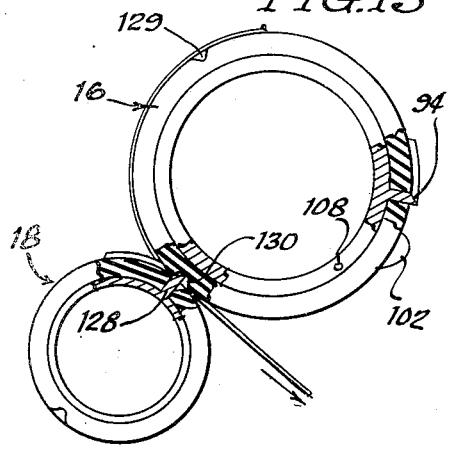
Fig. 13 is a view corresponding to that of Fig. 12, and showing another phase in the relationship of the large and small rollers.
Figure 14:
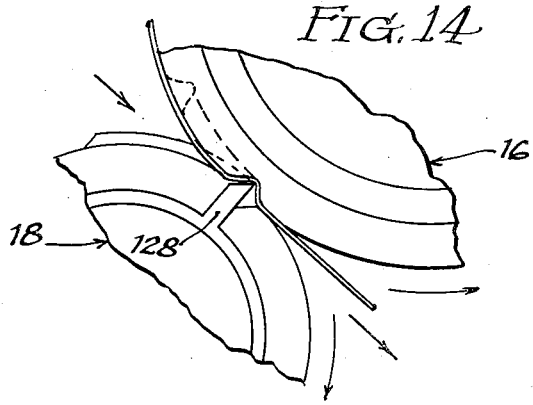
Fig. 14 is an enlarged fragmentary view according to Figs. 12 and 13.

Referring now to Figs. 1–4, a tape cutter 10 for chaff tape to be cut continuously into strips and discarded, is shown. The cutter is mounted by suitable bracket means in a container 12 having a motor 14 adapted to drive a drive pulley 16. A second pulley or roller 18 is pivotally mounted in the container 12 by means of a bracket arm 20 for predetermined proportional rotation relative to the roller 16 by means of a gear train including a pinion 22 journalled in the container 12 in meshing relationship with an annular gear 24, also shown in Fig. 11, and a pinion 26 of preferably the same diameter as pinion 22 and engaged in meshing relationship therewith as well as with a gear 28 on the pulley shaft 30 of roller 18.

The rollers or pulleys 16 and 18 are disposed in normally tangential relationship with respect to one another by means of a two-stage spring assembly 32 having an eyelet 34 of a rod 36 pivotally secured to the shaft 38 of the roller 16 by means of a cotter pin 40 or the like, and a cylindrical spring housing 42 pivotally secured at the end opposite the eyelet 34 to the shaft 30 by means of a bracket 44 mounted on the shaft and connected to the housing 42 through a tab 46 on the housing and latching means 48 and 50, as shown in Fig. 1.

The operation of the spring assembly 32 will be further described hereinafter, the assembly itself comprising relatively large helical outer spring 52 bearing at its upper end against a cap 54 threadedly receiving on the housing 42, and at its lower end against a disc 56 in the housing; and an inner spring surrounding the rod 36 and designated by numeral 58, which bears against a disc 60 secured to the shaft 36 by a pin 62. The outer end of the shaft 36 is threaded to receive a nut 64 adapted to maintain an adjustment spacer 66 in predetermined spaced relationship to the disc 56.

Although various modifications in the proportional rate of revolution of rollers 16 and 18 may be made without departing from the concept of the invention, a preferred embodiment provides substantially three revolutions of the roller 18 to two revolutions of the roller 16 in accordance with the relative diameters of the rollers, the gears 22 and 26 being substantially equal, as stated. Each of the rollers is provided with a cylindrical outer rubber or resilient matrix 68 and 70. Thus, the resilient cylindrical shell 68 is carried on a metallic drum 72 secured to the shaft 38 by means of a key 74 received in a slot 76 in the shaft 38. In order to compensate for variation between the gear teeth 24 and the keyway relationship, screws 78, 80, 82 and 84 are provided, the drum 72 defining slots 86, 88, 90 and 92 for this purpose. The drum 72 has formed integrally therewith a helical blade 94 extending thereacross and a slot 96, 98 and 100 is formed for each of a set of pivotally mounted levers 102, 104 and 106 carried by pins such as the pin 108 in the drum, for synchronized movement in a plurality of registered openings in the outer shell or tire 68—these openings being indicated by numerals 110, 112 and 114. Each of the levers 102 through 106 is biased outwardly through the registered slots by means of leaf springs 116, 118 and 120 in order to cam a piece of tape which has been cut into guided relationship with a deflector 122 mounted on the container 12 at a predetermined angle in close proximity to the roller 16, as hereinafter described.

The deflector 122 has three end slots, such as the slots 123 therein to receive the levers 102 through 106 while they thus dispose of the tape end which has been cut, and it will be seen that these levers have an outer rounded camming edge for the purpose of passing through the said slots 123 into extended or open relationship with respect to the roller 68 upon completion of their movement of the paper into the said guided relationship with the deflector 122.

Likewise, a drum 126 of the roller 18 is provided with a complementary helical blade 128 adapted to engage in cutting relationship with the blade 94 at predetermined intervals of rotation of the rollers 16 and 18; and for this purpose, so as to accommodate the blade 128 when it is not in said cutting relationship with the blade 94, but is in contact with the roller 16, the roller 16 has formed therein helically configured indentations 129 and 130 spaced equi-angularly from each other and a corresponding distance from the openings in the tire 68. Thus, as the roll 18 carries the blade 128 into successive engagements with the tire 68, the blade 128 will first engage within the indentation 130 and then within the indentation 129, before contacting the blade 94 as hereinafter described.

The drum 126 is held in resilient coaxial relationship with the shaft 30 by means of a torsion spring 132 having one end secured to the shaft and the other end to the said drum, as well as a corresponding torsion spring 134—these springs having a short throw for a purpose to be described hereinafter. In order to permit relative angular movement of the drum 126 and the shaft 30, a key 136 is disposed in a slot 138 in the shaft 30 for movement therein—the slot 138 being angularly formed for this purpose.

Outward, or counter rotational displacement of the roller 18 either by thickness of tape passing between the rolls 16 and 18 or engagement of the blades 94 and 128 as hereinafter set forth, will tend to produce rotation of the roll 18, counter to the direction of the arrow as shown in Fig. 4. The arrow shown in Fig. 4 associated with roller 18 indicates the normal direction of rotation thereof. This movement, as well as the movement or rotation due to the difference in the cutter-helix angles upon their engagement, is against the action of the torsion springs so that the springs adjust for this rotary displacement.

In particular, the edge of the cutting blade 94, at the end adapted to engage first with the blade 128 is recessed to provide a cam 140 which will gradually displace the blade 128 and the roller 18, axially. Thus, upon the initiation of shearing action, the roller 18 will have been dislodged, or counter rotated an extent such as to cock the torsion springs 132 and 134 whereby a predetermined amount of pressure is exerted upon the blades. The contact between the blades progresses gradually thereacross as cutting continues, the rotational force exerted by the torsion spring is added to the driving torque of the rollers a predetermined extent. It will be appreciated that this reduces the amount of torque or horsepower required in rotating the rollers 16 and 18 in the non-cutting relationship.

It is possible to disengage the blades during cutting action. To minimize such possibility through accident or inadvertence, while affording the opportunity of interruption or movement of the rollers apart if such should become necessary, the inner spring 58 permits the rod 36 to move axially toward the disc 56 a distance determined by the nut 64 and indicated by the spaced relation between the disc 66 and the disc 56. This movement is generally adequate to accommodate at least the displacement effected by the average thickness of the tape. However, the action of the spring 52 in pushing against the slidably mounted disc 56 is such as to maintain this disc in position against the action of the disc 66 thereagainst until such time as a very considerable force is applied to separate the rolls, such as a foreign object passing between them or prying with an external tool. When a force of this type is used to separate or displace the rollers 16 and 18, the disc 66 will come into abutting relationship with the disc 56 to compress the spring 52 to a desired extent.

The operation of the device will thus be continuous so as to provide bevel cuts on successive tape sections, such as indicated by numerals 142 and 144 in Fig. 5.

As indicated by the relative length of the bevel cut 145 to the length of the section 144, the cutting action preferably takes place for substantially 7% of the pulley time between cuts, it being understood that cutting is accomplished once for each two rotations of the roller 16 or each three rotations of roller 18. This is a result of the fact that in the preferred embodiment shown, substantially 14% of the circumference of the roller 16 is to be limited by the blade 94.

Figure 6:
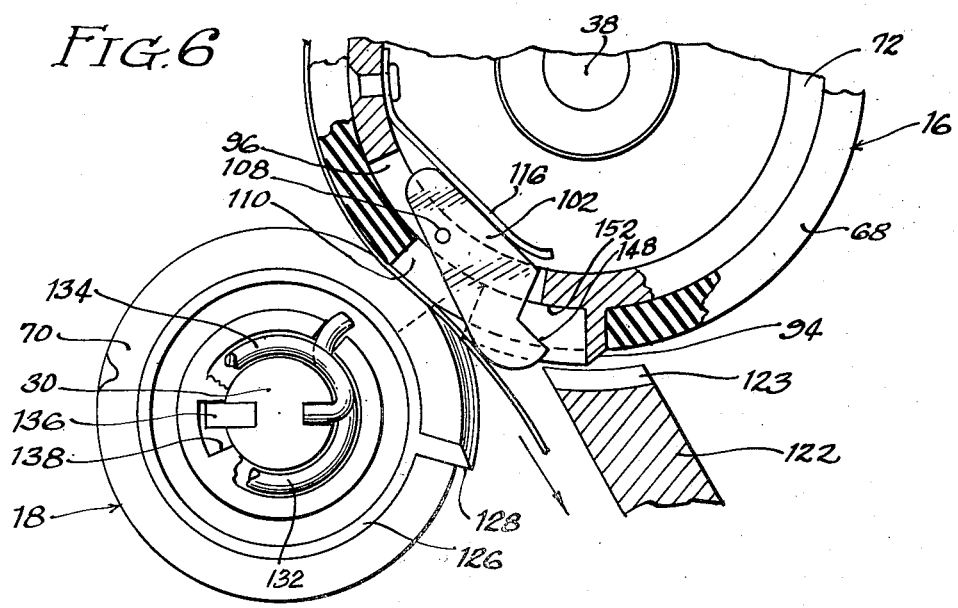
Fig. 6 is an enlarged detail view taken in vertical section, and showing the tape being guided from the cutter upon completion of a cutting operation.
Figure 7:
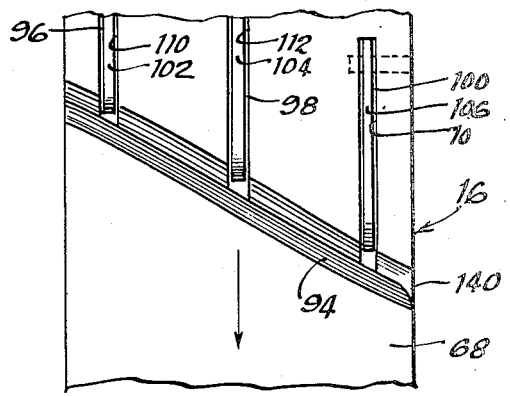
Fig. 7 is a plan view of the relatively large roller of the cutter, showing blade and tape displacing means thereon.
Figure 8:
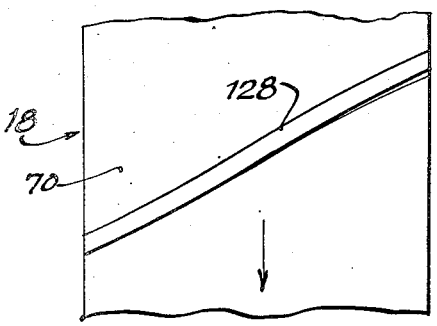
Fig. 8 is a corresponding view of the small roller, showing a blade adapted to coact in cutting relationship with the blade of Fig. 7.
Figure 9:
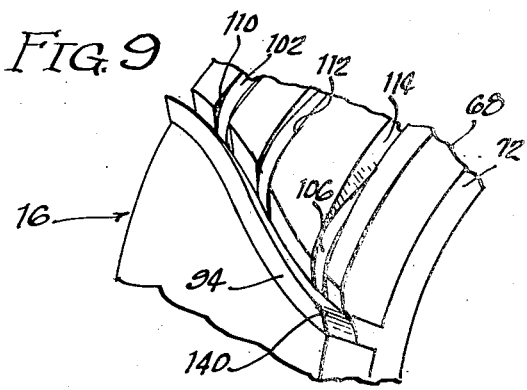
Fig. 9 is a fragmentary perspective view of the structure shown in Fig. 7.
Figure 10:
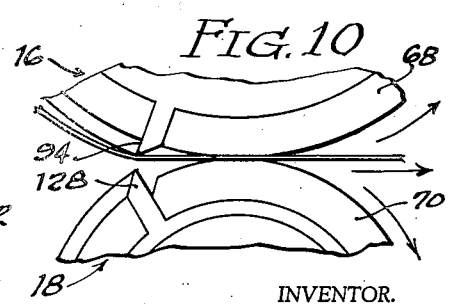
Fig. 10 is a fragmentary side elevational view showing tape in a position to be cut.

As stated, after an individual cut is made, the tape is cammed outwardly into guided relationship with the deflector 122 so that the deflector may peel it away from the rollers to prevent any danger of jamming and tangling of the tape in the machine. The arcuate outer end configuration of the levers 102—106 permits this camming action to be smoothly accomplished without catching, while the lower edge of the lever is likewise in smooth camming relationship with the actuating springs 116—120. Also, the portions 148 of the levers 102—106 are stepped to permit downward movement of the levers onto shelves such as shelf 152 upon completion of the said camming action by which the tape is presented to the deflector 122 and during movement of the levers past the roller 18 thereafter after the levers 102—106 pass roller 18 they assume their normal position as shown in Fig. 6.

As stated hereinbefore, any adjustment necessary in the relative angular position of the blades may be obtained by means of the screws 78 through 84, and their angularly elongated slots 86 through 92; and it will therefore be apparent that there will be no interference with the cutting action whatsoever once the device is timed initially. The action of the rollers will slide the tape along the deflector 122 with sufficient impetus so that there will be no accumulation thereof such as might otherwise obstruct important dispensing operations concurrent therewith, and the mechanism therefore provides a security of action of the highest degree.

Although I have herein set forth and described my invention with respect to certain principles and details thereof, it will be apparent to those skilled in the art that these may be varied without departing from the spirit and scope of the invention as set forth in the hereunto appended claims.

I claim:

1. In a device for cutting chaff tape and the like, a pair of rollers, a blade carried by each of said rollers having substantially helical configuration, means for biasing said rollers into contact, drive means for said rollers, said rollers and drive means providing a predetermined ratio of revolutions for the rollers whereby said blades are brought into cutting contact at predetermined intervals of at least more than one revolution of the large roller, said blades being timed to afford cutting contact at substantially a point with the contact point progressing from one end of the blades to the other and torsion spring means in one of the rollers adapted to afford slight angular movement of the blade carried by said roller upon said contact between said blades and to maintain said blades in predetermined substantially uniform stressed relationship whereby an effective cutting pressure is present throughout the entire cutting contact between said blades, said means for biasing said rollers into contact including a two-stage spring assembly, one of said stages permitting relative displacement of said rollers for a slight distance substantially corresponding to the average tape thickness and the other of said stages being responsive to applications of relatively high force or the presence of abnormally thick tape to permit movement of said rollers away from one another beyond said slight distance.

2. In a device for cutting chaff tape and the like, a pair of rollers, a blade carried by each of said rollers having a substantially helical configuration, means for biasing said rollers into contact, drive means for said rollers, said rollers and drive means providing a predetermined ratio of revolutions for the rollers whereby said blades are brought into cutting contact at predetermined intervals of at least more than one revolution of the large roller, said blades being timed to afford cutting contact at substantially a point with the contact point progressing from one end of the blades to the other and torsion spring means in one of the rollers adapted to afford slight angular movement of the blade carried by said roller upon said contact between said blades and to maintain said blades in predetermined substantially uniform stressed relationship whereby an effective cutting pressure is present throughout the entire cutting contact between said blades, said blade associated with said torsion spring means having the end adapted to effect initial contact with the other blade upon initiation of a cutting action having a recessed camming configuration whereby said roller may be angularly displaced for winding said torsion spring, said means for biasing said rollers into contact including a two-stage spring assembly, one of said stages permitting relative displacement of said rollers for a slight distance substantially corresponding to the average tape thickness and the other of said stages being responsive to applications of relatively high force to permit movement of said rollers away from one another beyond said slight distance.

3. In a device for cutting chaff tape and the like, a pair of rollers, a blade carried by each of said rollers having a substantially helical configuration, means for biasing said rollers into contact, drive means for said rollers, said rollers and drive means providing a predetermined ratio of revolutions for the rollers whereby said blades are brought into cutting contact at predetermined intervals of at least more than one revolution of the large roller, said blades being timed to afford cutting contact at substantially a point with the contact point progressing from one end of the blades to the other, and torsion spring means in one of the rollers adapted to afford slight angular movement of the blade carried by said roller upon said contact between said blades and to maintain said blades in predetermined substantially uniform stressed relationship whereby an effective cutting pressure is present throughout the entire cutting contact between said blades, the other of said rollers having lever means pivotally mounted therein in proximate relationship behind the blade for said roller, said lever means being spring biased outwardly whereby tape which has been cut may be cammed outwardly away from said rollers, said device having a deflector structure disposed at a predetermined angle of inclination below the rollers at their line of cotangency, said lever means being adapted to cam the tape into guided relationship with said deflector, said deflector having a slotted configuration for receiving therethrough said lever means upon completion of said camming operation.

4. A tape cutter comprising a relatively large roller, a relatively small roller, a blade carried by each of said rollers substantially in the form of a helix, drive means for driving said rollers at a predetermined rate such that said blades come into cutting contact upon completion of more than one revolution of the large roll, a two-stage spring assembly biasing said rollers into tangential contact, said spring assembly including a spring having limit means associated therewith for permitting a predetermined slight relative displacement of said rollers and a second spring effective upon relative displacement of said rollers to said predetermined extent and affording displacement beyond said predetermined extent but responsive only to force relatively greatly in excess of the force required to produce said slight relative displacement, the smaller of said rollers having a spindle and a drum mounted for limited angular revolution thereon, torsion spring means connecting said spindle and said drum adapted to be wound upon movement of said blades into cutting relationship whereby to effect a predetermined stressed relationship therebetween, a plurality of levers pivotally mounted in said large roller for movement about an axis parallel to the axis of revolution of said large roller, said large roller having apertures formed therein receiving said levers and said levers being disposed behind the blade on said large roller in proximate relationship thereto, and spring means slidably coacting with each of said levers for biasing said levers outwardly into camming relationship with tape which has been cut whereby to move the tape away from the rollers.

5. A tape cutter comprising a relatively large roller, a relatively small roller, a blade carried by each of said rollers substantially in the form of a helix, drive means for driving said rollers at a predetermined rate such that said blades come into cutting contact upon completion of more than one revolution of the large roller, a two-stage spring assembly biasing said rollers into tangential contact, said spring assembly including a spring having limit means associated therewith for permitting a predetermined slight relative displacement of said rollers and a second spring effective upon relative displacement of said rollers to said predetermined extent and affording displacement beyond said predetermined extent but responsive only to force relatively greatly in excess of the force required to produce said slight relative displacement, the smaller of said rollers having a spindle and a drum mounted for limited angular revolution thereon, torsion spring means connecting said spindle and said drum adapted to be wound upon movement of said blades into cutting relationship whereby to effect a predetermined stressed relationship therebetween, a plurality of levers pivotally mounted in said large roller for movement about an axis parallel to the axis of revolution of said large roller, said large roller having apertures formed therein receiving said levers and said levers being disposed behind the blade on said large roller in proximate relationship thereto, spring means slidably coacting with each of said levers for biasing said levers outwardly into camming relationship with tape which has been cut whereby to move the tape away from the rollers, and a deflector structure disposed at a predetermined angle below said rollers in proximate relationship to the line of contact therebetween, said deflector structure having a plurality of slots in register with said levers and adapted to receive said levers therethrough upon completion of a tape cutting and camming action, said levers having an arcuate outer edge structure for smooth camming relationship with the tape and easy movement through said finger structure.

6. A tape cutter comprising a relatively large roller, a relatively small roller, a blade carried by each of said rollers substantially in the form of a helix, drive means for driving said rollers at a predetermined rate such that said blades come into cutting contact upon completion of more than one revolution of the large roller, a two-stage spring assembly biasing said rollers into tangential contact, said spring assembly including a spring having limit means associated therewith for permitting a predetermined slight relative displacement of said rollers and a second spring effective upon relative displacement of said rollers to said predetermined extent and affording displacement beyond said predetermined extent but responsive only to force relatively greatly in excess of the force required to produce said slight relative displacement, the smaller of said rollers having a spindle and a drum mounted for limited angular revolution thereon, torsion spring means connecting said spindle and said drum adapted to be wound upon movement of said blades into cutting relationship whereby to effect a predetermined stressed relationship therebetween, a plurality of levers pivotally mounted in said large roller for movement about an axis parallel to the axis of revolution of said large roller, said large roller having apertures formed therein receiving said levers and said levers being disposed behind the blade on said large roller in proximate relationship thereto, spring means slidably coacting with each of said levers for biasing said levers outwardly into camming relationship with tape which has been cut whereby to move the tape away from the rollers, and a deflector structure disposed at a predetermined angle below said rollers in proximate relationship to the line of contact therebetween, said finger structure having a plurality of slots in register with said levers and adapted to receive said levers therethrough upon completion of a tape cutting and camming action, said levers having an arcuate outer edge structure for smooth camming relationship with the tape and easy movement through said finger structure, each of said levers having a stepped configuration below said arcuate outer edge structure, said large roller defining an abutment shelf below said stepped portion of said levers to limit inward movement of the levers upon rotation of the rollers into tangential relationship at the locus of said levers.

7. A tape cutter comprising a relatively large roller, a relatively small roller, a blade carried by each of said rollers substantially in the form of a helix, drive means for driving said rollers at a predetermined rate such that said blades come into cutting contact upon completion of more than one revolution of the large roller, a two-stage spring assembly biasing said rollers into tangential contact, said spring assembly including a spring having limit means associated therewith for permitting a predetermined slight relative displacement of said rollers and a second spring effective upon relative displacement of said rollers to said predetermined extent and affording displacement beyond said predetermined extent but responsive only to force greatly in excess of the force required to produce said slight relative displacement, the smaller of said rollers having a spindle and a drum mounted for limited angular revolution thereon, torsion spring means connecting said spindle and said drum adapted to be wound upon movement of said blades into cutting relationship whereby to effect a predetermined stressed relationship therebetween, a plurality of levers pivotally mounted in said large roller for movement about an axis parallel to the axis of revolution of said large roller, said large roller having apertures formed therein receiving said levers and said levers being disposed behind the blade on said large roller in proximate relationship thereto, spring means slidably coacting with each of said levers for biasing said levers outwardly into camming relationship with tape which has been cut whereby to move the tape away from the rollers, and a deflector structure disposed at a predetermined angle below said rollers in proximate relationship to the line of contact therebetween, said finger structure having a plurality of slots in register with said levers and adapted to receive said levers therethrough upon completion of a tape cutting and camming action, said levers having an arcuate outer edge structure for smooth camming relationship with the tape and easy movement through said deflector structure, each of said levers having a stepped configuration below said arcuate outer edge structure, said large roller defining an abutment shelf below said stepped portion of said levers to limit inward movement of the levers upon rotation of the rollers into tangential relationship at the locus of said levers, said large roller having helical recesses formed therein in complementary relationship to the helical blade on the small roller whereby said blade on said smaller roller, may be received in the indentations on the larger roller such that movement of said blade past said large roller prior to initiation of a cutting operation with the blade on the large roller, where with the rollers remain in smooth rolling contact at all times.

References Cited in the file of this patent

UNITED STATES PATENTS 162,607 Biedinger Apr. 27, 1875

(Other references on following page)

UNITED STATES PATENTS

| Number | Name | Date |
|---|---|---|
| 365,766 | Wood | June 28, 1887 |
| 597,211 | Winne | Jan. 11, 1898 |
| 709,408 | Jahnz | Sept. 16, 1902 |
| 880,465 | Price | Feb. 25, 1908 |
| 947,100 | Fuller | Jan. 18, 1910 |
| 1,398,474 | Strawn | Nov. 29, 1921 |
| 1,738,076 | Molins | Dec. 3, 1929 |
| 1,749,430 | Iversen | Mar. 4, 1930 |
| 1,751,562 | Stinger | Mar. 25, 1930 |
| 1,781,900 | Friede et al. | Nov. 18, 1930 |
| 1,829,456 | Robbins et al. | Oct. 27, 1931 |
| 2,059,187 | Talbot | Oct. 27, 1936 |
| 2,341,956 | Staude | Feb. 15, 1944 |
| 2,354,294 | Schimmel | July 25, 1944 |
| 2,361,300 | Loverch | Oct. 24, 1944 |